United States Patent [19]

Nierhaus et al.

[11] 4,306,701

[45] Dec. 22, 1981

[54] REAR VIEW MIRROR MOUNTING ARRANGEMENT

[75] Inventors: Volker Nierhaus, East Detroit; Gary L. Smith, Pontiac, both of Mich.

[73] Assignee: General Motors Corporation, Detroit, Mich.

[21] Appl. No.: 74,517

[22] Filed: Sep. 11, 1979

[51] Int. Cl.³ .............................................. A47G 1/24
[52] U.S. Cl. .................. 248/479; 296/84 B; 350/307
[58] Field of Search ............. 248/477, 478, 479, 485, 248/486, 487, 291; 296/84 B; 350/307

[56] References Cited

U.S. PATENT DOCUMENTS

| | | | |
|---|---|---|---|
| 2,089,463 | 8/1937 | Ritz-Woller | 248/481 |
| 2,146,859 | 2/1939 | Seklehner | 248/481 X |
| 2,696,965 | 12/1954 | Maxwell | 248/479 |
| 3,575,375 | 4/1971 | Strem | 248/481 |
| 3,833,198 | 9/1974 | Holzman | 248/476 |
| 3,976,275 | 8/1976 | Clark | 248/487 |
| 3,981,474 | 9/1976 | Szilagyi | 248/487 |
| 4,030,692 | 6/1977 | Szilagyi | 248/487 |
| 4,166,651 | 9/1979 | Vandenbrink | 248/487 X |

FOREIGN PATENT DOCUMENTS 1532065  11/1978  United Kingdom ............. 296/84 B

*Primary Examiner*—J. Franklin Foss
*Attorney, Agent, or Firm*—Edward J. Biskup

[57] ABSTRACT

Mounting arrangement for the mirror member of an outside rear view mirror assembly characterized in that a mounting plate is provided that includes a support surface to which the mirror member is fixedly connected and also includes a bracket which adjustably connects the mirror member to a tubular support.

2 Claims, 4 Drawing Figures

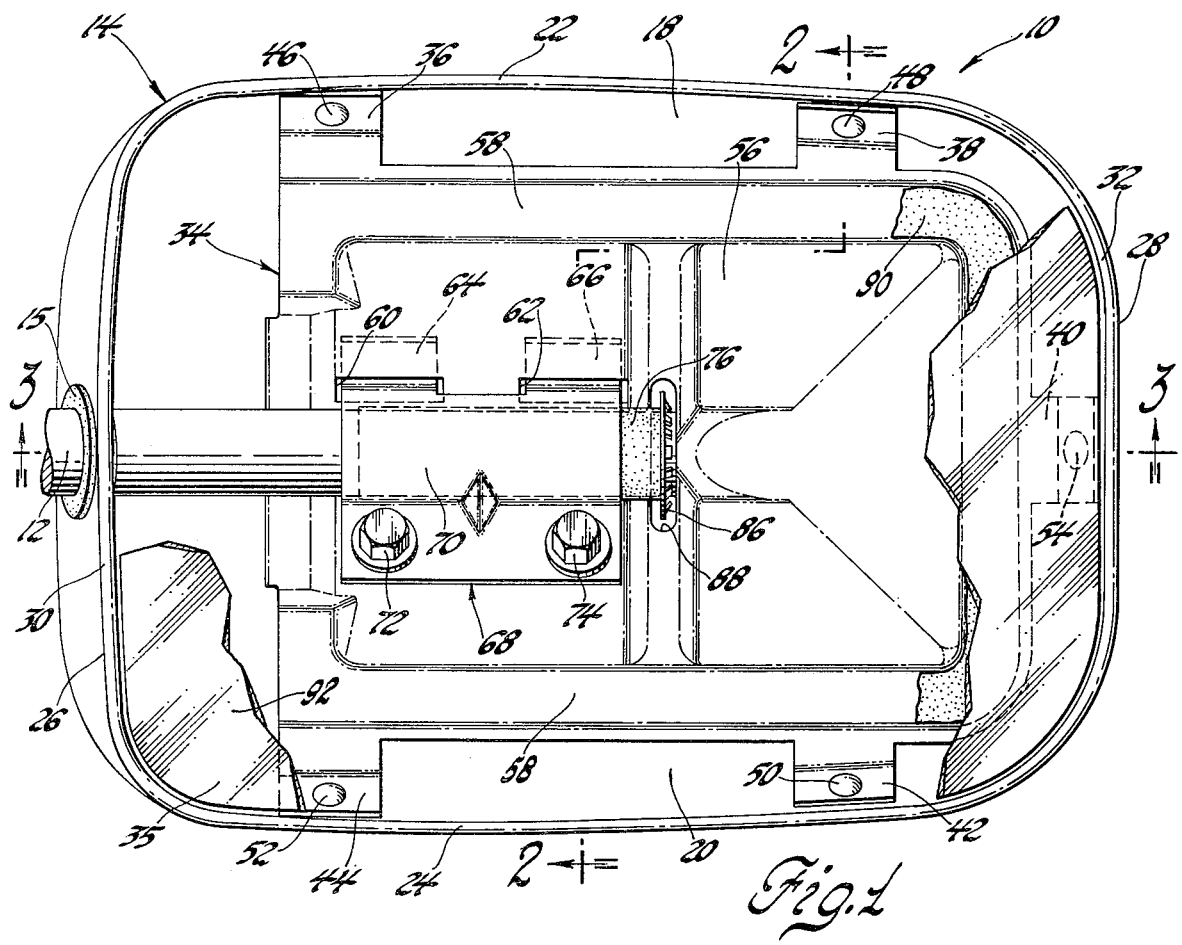
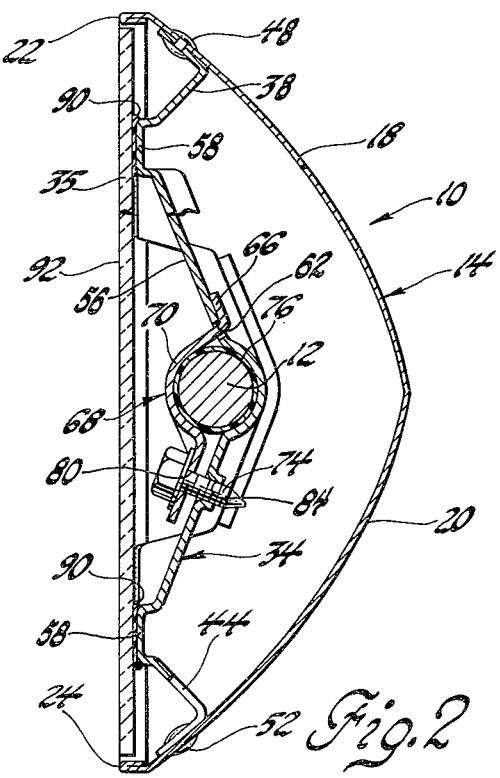

REAR VIEW MIRROR MOUNTING ARRANGEMENT

This invention relates to rear view mirrors for vehicles and more particularly concerns a mounting arrangement which serves to hold a mirror member in a fixed position relative to a housing and also provides an adjustable connection between a support arm and the mirror member.

More specifically, this invention is intended to be used with an outside rear view mirror assembly that is adapted to be mounted to the door of a vehicle. The mirror assembly comprises a housing integrally formed with a forwardly projecting top wall, bottom wall and a pair of side walls all of which terminate with an edge that lies in a single plane and defines an opening which accommodates a mirror member. An aperture is formed in one of the side walls and a tubular support arm extends through the aperture into the interior of the housing. A mounting plate having a plurality of outwardly extending tabs is located within the housing and is formed with a well portion which is surrounded by a raised U-shaped support surface. The mirror member is mounted on the support surface and the tabs are fixedly connected to at least two of the walls at oppositely located points so as to position the support surface and the mirror member parallel to the edge of the housing. In addition, a bracket is formed with a pair of tangs which extend into openings in the well portion of the mounting plate and also includes a semi-circular portion which engages the tubular support arm and allows the housing to be adjustably rotated about the longitudinal axis thereof.

The objects of the present invention are to provide a new and improved mounting arrangement for the mirror member of an outside rear view mirror assembly; to provide a new and improved outside rear view mirror for a vehicle that allows the mirror member to be readily replaced if the need should arise; to provide a new and improved mounting plate for a rear view mirror that includes a support surface to which the mirror member can be fixed and also includes a bracket which adjustably connects the mirror member to a tubular support arm; to provide a new and improved outside rear view mirror in which the mirror member is located within a housing and is fixedly connected thereto through a mounting plate which facilitates mirror replacement without damage to the housing; and to provide a new and improved rear view mirror assembly which utilizes a unique bracket for providing an adjustable connection between a support arm and the mirror mounting.

Other objects and advantages of the present invention will be apparent from the following detailed description when taken with the drawings in which:

FIG. 1 is an elevational view showing a rear view mirror assembly incorporating a mounting arrangement made in accordance with the invention;

FIG. 2 is a sectional view of the mounting arrangement taken on lines 2—2 of FIG. 1;

Figure 3:
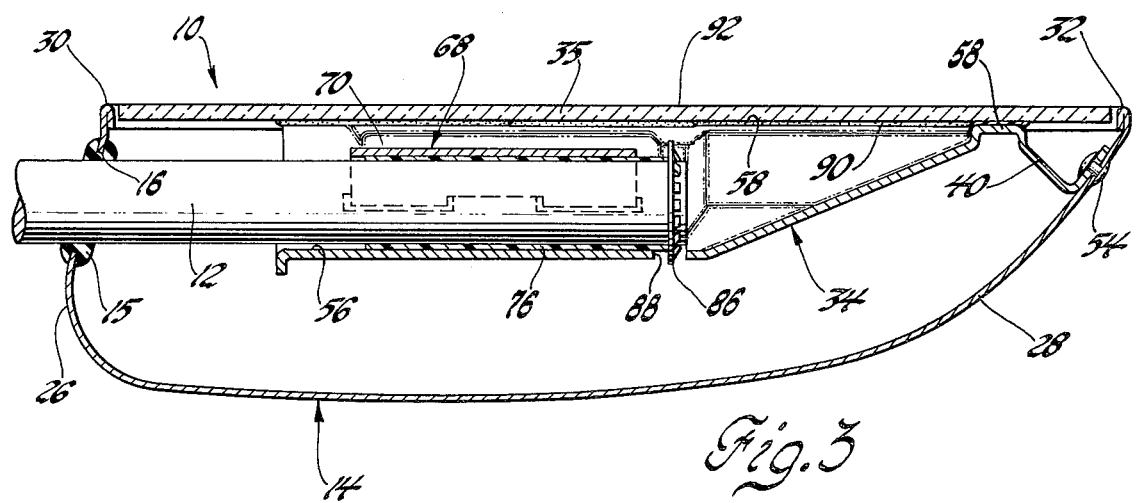
FIG. 3 is a sectional view of the mounting arrangement taken on lines 3—3 of FIG. 2.

Referring to the drawings and more particularly FIGS. 1, 2 and 3 thereof, the head portion 10 of a rear view mirror assembly is shown adjustably mounted on a horizontally oriented tubular support arm 12 one end of which extends into a housing 14 through a grommet 15 located in a circular aperture 16 while the other end of the support arm 12 (not shown) is adapted to be mounted through a suitable bracket (not shown) to the outside surface of a vehicle door for movement about a vertical axis. The housing 14 is generally rectangular in outer configuration and comprises a back wall which is composed of a top wall 18 and bottom wall 20 which, as seen in FIG. 2, are arranged in a generally V-shaped configuration when viewed in cross section and respectively terminate with forwardly projecting straight edges 22 and 24. The housing 14 also includes a pair of laterally spaced side walls 26 and 28 which are integral with the top and bottom walls 18 and 20 and terminate respectively with forwardly projecting edges 30 and 32 which lie in a common plane with the edges 22 and 24.

Located within the interior of the housing 14 is a generally rectangular mounting plate 34 which fixedly supports a mirror member 35 and is integrally formed with outwardly extending tabs 36, 38, 40, 42 and 44. As best seen in FIG. 1, tabs 36 and 38 are fastened to the top wall 18 by rivets 46 and 48 while tabs 42 and 44 are fastened to the bottom wall 20 by rivets 50 and 52. In addition, tab 40 is fastened to the side wall 28 by a rivet 54 so that together with the other tabs, the mounting plate 34 is rigidly fixed in position at points adjacent to the edges 22, 24 and 32 of the housing 14 so as to provide a substantially unitary construction. In addition, the mounting plate 34 has a depressed concave portion or well portion 56 formed therein which is surrounded by an upstanding raised surface 58 that is generally U-shaped and is located in a common plane which is parallel to a plane extending through the edges 22, 24, 30 and 32 of the top, bottom and side walls 18, 20, 26 and 28.

Figure 4:
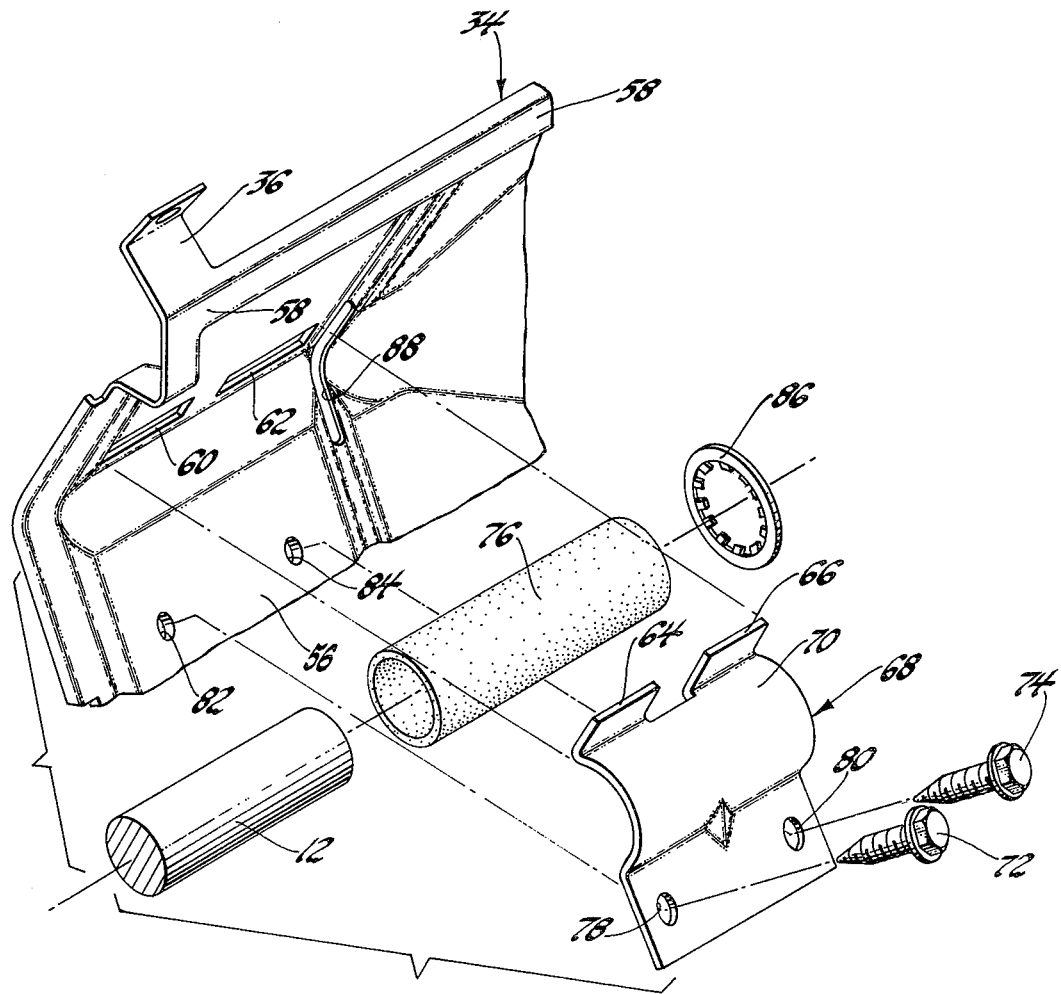
FIG. 4 is an exploded view showing the construction of the bracket portion of the mounting arrangement that connects a tubular support arm to the mirror member.

As best seen in FIG. 4, a pair of aligned slots 60 and 62 are formed in the well 56 and are adapted to receive a pair of spaced tangs 64 and 66 integrally formed on a bracket 68. The bracket 68 has a semi-circular portion 70 which through a pair of screws 72 and 74 serves to frictionally connect the mounting plate 34 to the support arm 12. In this connection it will be noted that a sleeve 76 made of elastomeric material is fitted on the end of the support arm 12 and is positioned between the semi-circular portion 70 of bracket 68 and the support arm 12 so as to provide frictional arrangement therebetween. The amount of frictional engagement can be controlled through the screws 72 and 74 which respectively extend through holes 78 and 80 in the bracket 68 into accommodating holes 82 and 84 formed in the well 56 of the mounting plate 34. Moreover, in order to prevent the support arm 12 from moving axially of the bracket 68, a lock washer 86 is provided which encircles the end portion of the support arm 12 and partially extends into a transversely extending slot 88 in the well 56.

As seen in FIGS. 2 and 3, the mirror member 35 is connected to the support surface 58 of mounting member 34 by a suitable adhesive such as an epoxy resin 90 or the like. Inasmuch as the support surface 58 is in a plane parallel to the plane of the edges 22, 24, 30 and 32, it naturally follows that the outer surface 92 of the mirror member 35 is also parallel to the edges. Moreover, as seen in FIGS. 2 and 3, the outer surface 92 is positioned in alignment with the edges so as to provide a finished and attractive mirror head arrangement.

As should be apparent from the above, the mounting plate 34 serves the dual function of holding the mirror member 35 in a fixed position relative to the housing 14 as well as providing a connection between the mirror member 35 and the support arm 12. Inasmuch as the mirror member 35 is separate from the housing, the mirror member 35 can be readily replaced in the event that it is broken. Moreover, by locating the tabs 36-44 adjacent to the edges 22, 24, 30 and 32 of the housing 14, the bracket 68 can apply an increased amount of clamping force to the support arm 12 so as to minimize vibratory movement of the mirror member 35 while still allowing movement thereof by grasping the housing 14 and rotating it about the longitudinal axis of the support arm.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. An outside rear view mirror assembly adapted to be mounted to a vehicle, said rear view mirror assembly comprising a housing integrally formed with a forwardly projecting top wall, bottom wall and a pair of side walls all of which terminate with an edge which lies in a single plane and defines an opening, one of said side walls having an aperture formed therein, a tubular support extending through said aperture into the interior of said housing, a mounting plate having a plurality of outwardly extending tabs connected thereto and being formed with a well portion surrounded by a raised support surface, a pair of slots formed in said mounting plate, a mirror member mounted on said support surface and fixedly connected thereto, fastener means connecting said tabs to at least two of said walls at oppositely disposed points so as to position said mirror member parallel to said edge, and bracket means formed with a pair of tangs which extend into said slots and including screw means for frictionally connecting the tubular support to said mounting plate within the well portion thereof so that said housing is rotatable about the longitudinal axis of said tubular support.

2. An outside rear view mirror assembly adapted to be mounted to a vehicle, said rear view mirror assembly comprising a housing integrally formed with a forwardly projecting top wall, bottom wall and a pair of side walls all of which terminate with an edge which lies in a single plane and defines an opening, one of said side walls having an aperture formed therein, a tubular support extending through said aperture into the interior of said housing, a mounting plate having a plurality of outwardly extending tabs connected thereto and being formed with a well portion surrounded by a raised U-shaped support surface, a pair of axially aligned slots formed in said mounting plate, a mirror member mounted on said support surface and fixedly connected thereto, fastener means connecting said tabs to at least two of said walls at oppositely disposed points and adjacent said edge so as to position said mirror member parallel to said edge, and bracket means having a pair of tangs and a semi-circular portion, said tangs extending into said slots and said semi-circular portion engaging the tubular support whereby the bracket connects the tubular support to said mounting plate within the well portion thereof so that said housing is rotatable about the longitudinal axis of said tubular support.

* * * * *